(12) United States Patent
Howell et al.

(10) Patent No.: US 11,260,961 B2
(45) Date of Patent: Mar. 1, 2022

(54) AIRCRAFT HYDRAULICS

(71) Applicant: Airbus Operations Limited, Bristol (GB)

(72) Inventors: George Howell, Bristol (GB); Nicholas Crane, Bristol (GB)

(73) Assignee: Airbus Operations Limited, Bristol (GB)

( * ) Notice: Subject to any disclaimer, the term of this patent is extended or adjusted under 35 U.S.C. 154(b) by 842 days.

(21) Appl. No.: 16/014,298

(22) Filed: Jun. 21, 2018

(65) Prior Publication Data

US 2018/0370616 A1  Dec. 27, 2018

(30) Foreign Application Priority Data

Jun. 23, 2017 (GB) ..................... 1710103

(51) Int. Cl.
| | | |
|---|---|---|
| *B64C 13/42* | (2006.01) | |
| *B64C 25/22* | (2006.01) | |
| *B64C 25/30* | (2006.01) | |
| *B64C 25/42* | (2006.01) | |
| *B64C 25/60* | (2006.01) | |

(52) U.S. Cl.
CPC .............. *B64C 13/42* (2013.01); *B64C 25/22* (2013.01); *B64C 25/30* (2013.01); *B64C 25/42* (2013.01); *B64C 25/60* (2013.01)

(58) Field of Classification Search
CPC ......... B64C 13/42; B64C 25/30; B64C 25/42; B64C 25/60; B64C 25/22
See application file for complete search history.

(56) References Cited

U.S. PATENT DOCUMENTS

| | | | | |
|---|---|---|---|---|
| 8,038,094 B2* | 10/2011 | Oyama | ................. | F15B 20/004 |
| | | | | 244/99.6 |
| 2005/0132877 A1* | 6/2005 | Hart | ........................ | F15B 18/00 |
| | | | | 91/509 |
| 2008/0251637 A1* | 10/2008 | Reynes | ................... | B64C 25/24 |
| | | | | 244/100 R |
| 2009/0242694 A1 | 10/2009 | Oyama | | |
| 2010/0017052 A1* | 1/2010 | Luce | ................... | G01M 3/3245 |
| | | | | 701/16 |

(Continued)

FOREIGN PATENT DOCUMENTS

| | | |
|---|---|---|
| EP | 2 974 922 | 1/2016 |
| GB | 757705 | 9/1956 |
| WO | 2009/124027 | 10/2009 |

OTHER PUBLICATIONS

European Extended Search Report cited in EP 18179489.2 dated Nov. 26, 2018, 9 pages.

*Primary Examiner* — Valentina Xavier
(74) *Attorney, Agent, or Firm* — Nixon & Vanderhye P.C.

(57) ABSTRACT

A hydraulic system 300 for an aircraft including a backup hydraulic pressure source 216 to provide hydraulic pressure to a brake 222 in the event of a failure condition of a primary hydraulic brake pressure source. The hydraulic system 300 also includes a landing gear backup system to provide hydraulic pressure to enable extension and/or retraction of landing gear 100. The backup hydraulic pressure source 216 is arranged to provide hydraulic pressure to the landing gear backup system in the event of a failure condition of a primary landing gear hydraulic pressure source.

13 Claims, 5 Drawing Sheets

(56) References Cited

U.S. PATENT DOCUMENTS

| | | | |
|---|---|---|---|
| 2011/0088383 A1* | 4/2011 | Morvan | F15B 20/005 |
| | | | 60/403 |
| 2015/0151832 A1* | 6/2015 | Filho | B64C 25/30 |
| | | | 244/102 R |
| 2017/0073063 A1* | 3/2017 | Filho | B64C 25/30 |
| 2019/0193704 A1* | 6/2019 | Zell | B60T 13/141 |
| 2020/0017202 A1* | 1/2020 | Georgin | B60T 8/325 |

* cited by examiner

500

AIRCRAFT HYDRAULICS

This application claims priority to United Kingdom Patent Application GB1710103.1 filed Jun. 23, 2017, the entirety of which is incorporated by reference.

TECHNICAL FIELD

The present invention relates to a hydraulic system for an aircraft.

BACKGROUND

Aircraft systems often use hydraulic power to transmit force to a mechanical component to move that component, for example. For example, many aircraft have one or more retractable landing gear that can be extended or retracted by appropriate transmission of hydraulic fluid to hydraulic actuators mechanically coupled to the landing gear.

Many such hydraulic aircraft systems are powered from a central hydraulic power source. That source may, for example, comprise an electric pump powered by the aircraft engines to generate hydraulic pressure.

In some aircraft, the central hydraulic power source may provide a source of hydraulic pressure for multiple hydraulic aircraft systems. For example, the central hydraulic power source may provide hydraulic power for the landing gear and for powering hydraulic brakes.

For a hydraulic system that performs a critical function (such as unlocking the landing gear), a backup mechanism may be provided. For example, the backup mechanism may be an alternate hydraulic system, a hand-crank, compressed air (nitrogen), a pyrotechnic or a free-fall (i.e. gravity driven) system. In the case of an alternate hydraulic system, a dedicated backup source of hydraulic pressure may be used to provide hydraulic pressure to perform those critical functions if a main source of hydraulic pressure fails.

The present application discloses an improvement to such an alternate hydraulic system.

SUMMARY

A first aspect of the present invention provides a hydraulic system for an aircraft, the hydraulic system comprising: a backup hydraulic pressure source to provide hydraulic pressure to a brake in the event of a failure condition of a primary hydraulic brake pressure source; and a landing gear backup system to provide hydraulic pressure to enable extension and/or retraction of landing gear, wherein, the backup hydraulic pressure source is arranged to provide hydraulic pressure to the landing gear backup system in the event of a failure condition of a primary landing gear hydraulic pressure source.

Optionally, the hydraulic system comprises a valve arranged to selectively direct hydraulic fluid from the backup hydraulic pressure source to the landing gear backup system.

Optionally, the hydraulic system comprises a controller arranged to detect a failure condition of the primary landing gear pressure source, wherein, in response to the detected failure condition, the controller is arranged to transmit an activation signal to the valve to fluidically couple the backup hydraulic pressure source to the landing gear backup system.

Optionally, the backup hydraulic pressure source is an accumulator arranged to receive a supply of pressurised hydraulic fluid from a primary hydraulic pressure source.

Optionally, the primary hydraulic pressure source is a hydraulic system powered by the aircraft.

Optionally, the landing gear comprises a landing gear lock arranged to hold the landing gear in a retracted state, and wherein the backup hydraulic pressure is to provide hydraulic pressure to deactivate the landing gear lock in the event of a failure condition of the primary landing gear hydraulic pressure source.

Optionally, the landing gear comprises a landing gear door lock arranged to hold a landing gear door in a closed state, and wherein the backup hydraulic pressure is to provide hydraulic pressure to deactivate the landing gear door lock in the event of a failure condition of a the primary landing gear hydraulic pressure source.

Optionally, the respective failure conditions are a reduction of hydraulic pressure from the respective hydraulic pressure sources, beyond a specified threshold.

Optionally, the respective failure conditions are a spike in the hydraulic pressure from the respective hydraulic pressure source, beyond a specified threshold.

A second aspect of the present invention provides an aircraft comprising the hydraulic system according to the first aspect of the present invention.

A third aspect of the present invention provides a method of operating an aircraft hydraulic system comprising a backup hydraulic pressure source to provide hydraulic pressure to a brake in the event of a failure condition of a primary hydraulic brake pressure source and a landing gear backup system to provide hydraulic pressure to enable extension and/or retraction of landing gear, the method comprising: detecting a failure condition of a primary landing gear hydraulic pressure source; and, in response to detecting a failure condition of the primary landing gear hydraulic pressure source, providing hydraulic pressure to the landing gear backup system from the backup hydraulic pressure source.

Optionally, the method comprises, in response to detecting a failure condition of the primary landing gear pressure source, controlling a valve to direct hydraulic fluid from the backup hydraulic pressure source to the landing gear backup system.

A fourth aspect of the present invention provides a computer program which, when executed by a processor in a hydraulic system comprising a backup hydraulic pressure source to provide hydraulic pressure to a brake in the event of a failure condition of a primary hydraulic brake pressure source and a landing gear backup system to provide hydraulic pressure to enable extension and/or retraction of landing gear, causes the processor to: detect a failure condition of a primary landing gear hydraulic pressure source; and, in response to detecting a failure condition of the primary landing gear hydraulic pressure source, provide hydraulic pressure to the landing gear backup system from the backup hydraulic pressure source.

A fifth aspect of the present invention provides a hydraulic system for an aircraft, configured to: provide hydraulic pressure to a brake of the aircraft from a hydraulic pressure source in the event of a reduction of a primary hydraulic brake pressure; and provide hydraulic pressure to a landing gear backup system, from the hydraulic pressure system of the aircraft in the event of a reduction of a primary landing gear hydraulic pressure.

BRIEF DESCRIPTION OF THE DRAWINGS

Embodiments of the invention will now be described, by way of example only, with reference to the accompanying drawings, in which.

DETAILED DESCRIPTION

Figure 1:
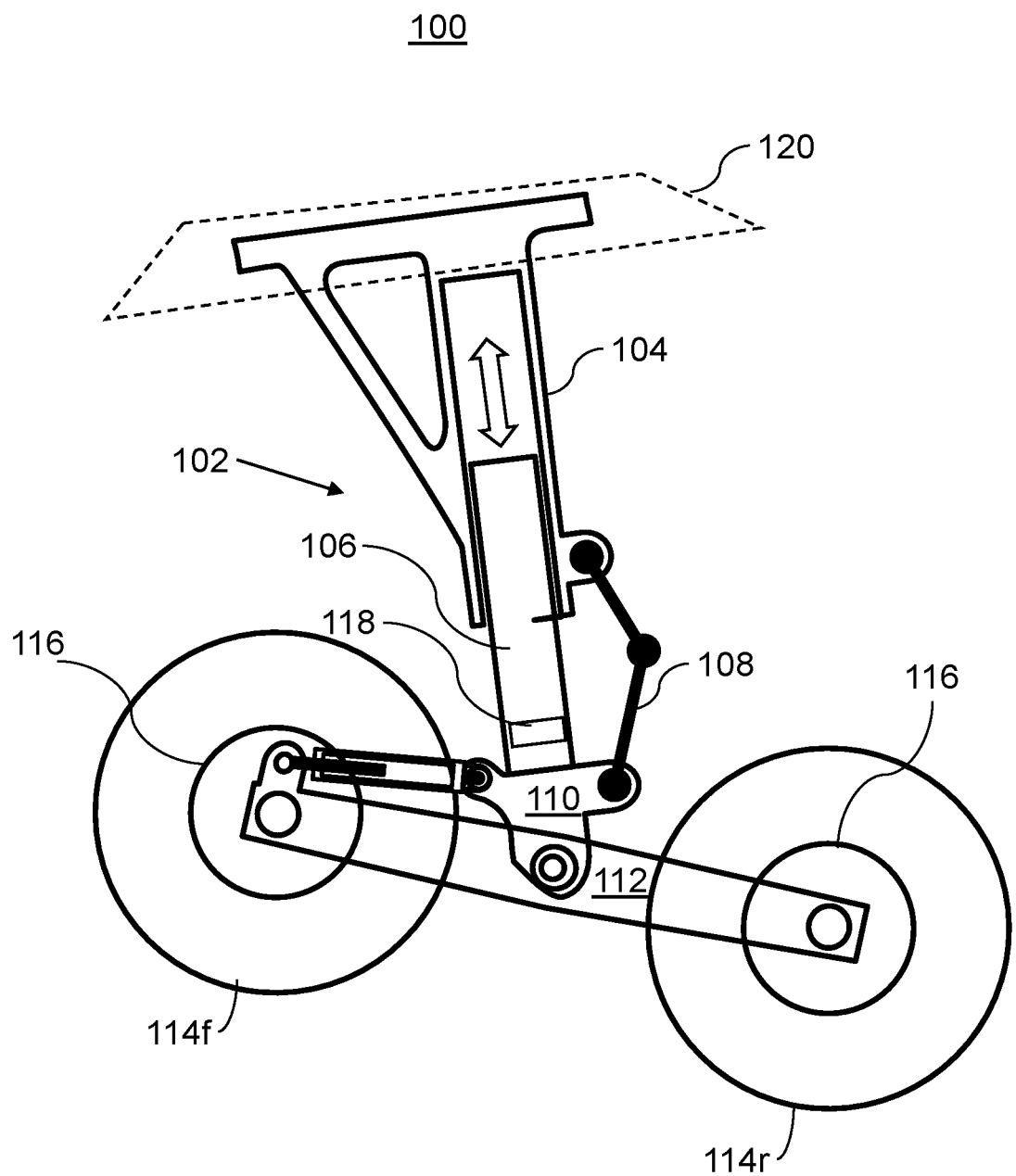
FIG. 1 is a schematic diagram of a side elevation of a known landing gear arrangement.

FIG. 1 illustrates major elements of an exemplary landing gear arrangement 100 for an aircraft, which forms part of a Landing Gear Extension/Retraction System (LGERS). The landing gear arrangement 100 generally comprises a shock strut 102 (for example, an oleo-pneumatic shock strut) having a main fitting 104 attached to the aircraft (for example to a wing or to the aircraft fuselage) and a slider 106 (or post), which can slide into the main fitting 104 against the pressure of a fluid or fluids to form a shock absorbing element. A torque link assembly 108 couples the main fitting 104 to a torque link lug structure 110 at a lower end of the slider 106. The torque link lug structure 110 also pivotally connects the shock strut 102 to a bogie beam assembly 112, which supports at least one wheel 114f at the front of the landing gear arrangement 100 and at least one wheel 114r at the rear of the landing gear arrangement 100. Typically there are two or more wheels at each end of the bogie beam assembly 112.

Each wheel 114f, 114r comprises a wheel brake 116 for providing a retardation function (under the control of the pilot) while the aircraft is on the ground. Other retardation functions available to the aircraft may be provided by one or more of thrust reversers, ground spoilers, and/or lift dumpers, for instance, and may generally be referred to herein as 'braking'. Braking by wheel braking is provided by the wheel brakes 116 and is typically initiated when sustained ground contact has occurred.

The landing gear arrangement 100 comprises an up-lock roller 118 arranged to engage a landing gear up-lock (not shown) when the landing gear is in a retracted position. The landing gear arrangement 100 may also comprise a down-lock roller (not shown for clarity) arranged to engage a landing gear down-lock (not shown) when the landing gear is in an extended position.

The landing gear arrangement 100 also comprises a door 120 (shown schematically with a dashed line) which opens from the aircraft (for example, from the aircraft fuselage, or an underside of the wing) to enable extension of the landing gear arrangement 100 for landing, and closes to the aircraft to conceal the landing gear arrangement 100 during flight. The door 120 may comprise an up-lock (not shown for clarity) for holding the door 120 in a closed position and/or a down-lock (not shown for clarity) for holding the door 120 in an open position.

Figure 2:
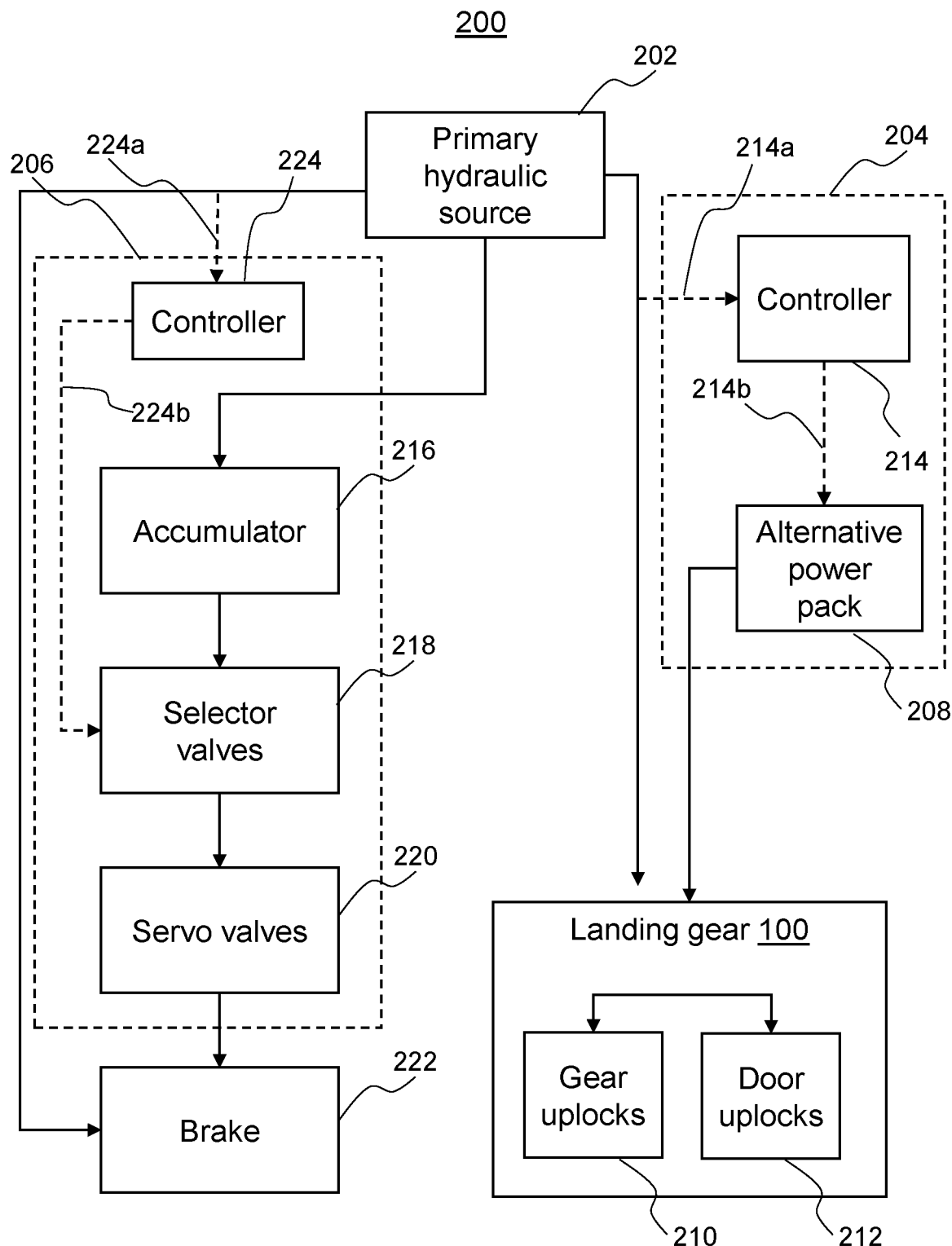
FIG. 2 is a schematic diagram of a known hydraulic system for an aircraft.

FIG. 2 is a simplified schematic diagram of a prior art hydraulic system 200 for providing hydraulic power to a landing gear arrangement, such as the landing gear arrangement 100 described above with reference to FIG. 1.

The hydraulic system 200 is, in normal operation, powered by a central hydraulic power source 202. The hydraulic system 200 also includes a landing gear backup system 204 and a backup braking system 206.

The landing gear backup system 204 is for providing hydraulic pressure to enable extension and/or retraction of landing gear arrangement 100 in the event of a failure of the primary hydraulic power source 202 to provide hydraulic pressure to the landing gear arrangement 100.

The landing gear backup system 204 comprises an alternative power pack 208, which may be engaged to provide hydraulic pressure to the landing gear arrangement 100 in the event of a failure of the primary hydraulic power source 202 to provide sufficient hydraulic pressure to the landing gear arrangement 100. In particular, in some examples, the alternative power pack 208 may comprise a hydraulic pump with a supply of hydraulic fluid to provide hydraulic power to at least gear up-locks 210 and door up-locks 212, so that in the event of a failure of the primary hydraulic power source 202 to provide hydraulic power to the landing gear arrangement 100, the doors 120 can be opened and the landing gear arrangement 100 can be moved to its extended position.

The landing gear backup system 204 comprises a landing gear backup controller 214 arranged to detect a failure condition of the primary hydraulic power source 202. For example, the landing gear backup controller 214 may comprise a pressure sensor for sensing a pressure provided by the primary hydraulic power source 202 and a processor to receive a pressure signal (indicated by the dashed arrow 214a) and evaluate the pressure signal. The processor may be programmed to send a control signal (indicated by the dashed arrow 214b) to activate the alternate power pack 208 in the event that a sensed pressure falls below a threshold pressure, for example.

The backup braking system 206 is for providing hydraulic pressure to enable braking of the aircraft in the event of a failure of the primary hydraulic power source 202 to provide sufficient hydraulic pressure to a system providing a retardation function. For example, in relation to the landing gear arrangement 100 depicted in FIG. 1, the backup braking system 206 may be arranged to provide hydraulic pressure to enable operation of the wheel brakes 116 while the aircraft is on the ground.

In the example shown in FIG. 2, the backup braking system 206 comprises an accumulator 216, a backup braking selector valve 218, and a backup braking servo valve 220. In some embodiments, the backup braking selector valve 218 and the backup braking servo valve 220 may be different from a primary selector valve and servo valve. In other embodiments, the backup braking selector valve 218 and the backup braking servo valve 220 may be the same valves used by the primary hydraulic system but powered, in the event a failure of the primary hydraulic power source, from a backup hydraulic source.

The accumulator 216 is a pressure storage reservoir in which hydraulic fluid is held under a hydraulic pressure generated by an external source. In particular, the accumulator 216 is selected to provide a sufficient volume of pressurised hydraulic fluid to operate a brake 222 (or brakes) in the event of a failure of the primary hydraulic power source 202 to provide sufficient hydraulic pressure to the brake 222.

In the example shown in FIG. 2, the external source is the primary hydraulic power source 202, which, in normal use, maintains a predetermined hydraulic pressure for a predetermined volume of hydraulic fluid in the accumulator 216.

The backup brake system 206 comprises a backup braking controller 224 arranged to detect a failure condition of the primary hydraulic power source 202. For example, the backup braking controller 224 may comprise a pressure sensor for sensing a pressure provided by the primary hydraulic power source 202 and a processor to receive a pressure signal (indicated by the dashed arrow 224a) and evaluate the pressure signal. The processor may be programmed to send a control signal (indicated by the dashed arrow 224b) operate the backup braking selector valve 218 to operate the brake 222 in the event that a sensed pressure falls below a threshold pressure, for example. Thus, in the event of a failure of the primary hydraulic power source 202 to provide sufficient hydraulic pressure to the brake 222, the accumulator 216 provides hydraulic pressure via the backup braking selector valve 218 and the backup braking servo valve 220, which in turn apply the brake 222 (such as a wheel brake 116 or brakes).

In some examples, the backup braking controller 224 may be implemented in the same hardware and/or software as the landing gear backup controller 214.

Figure 3:
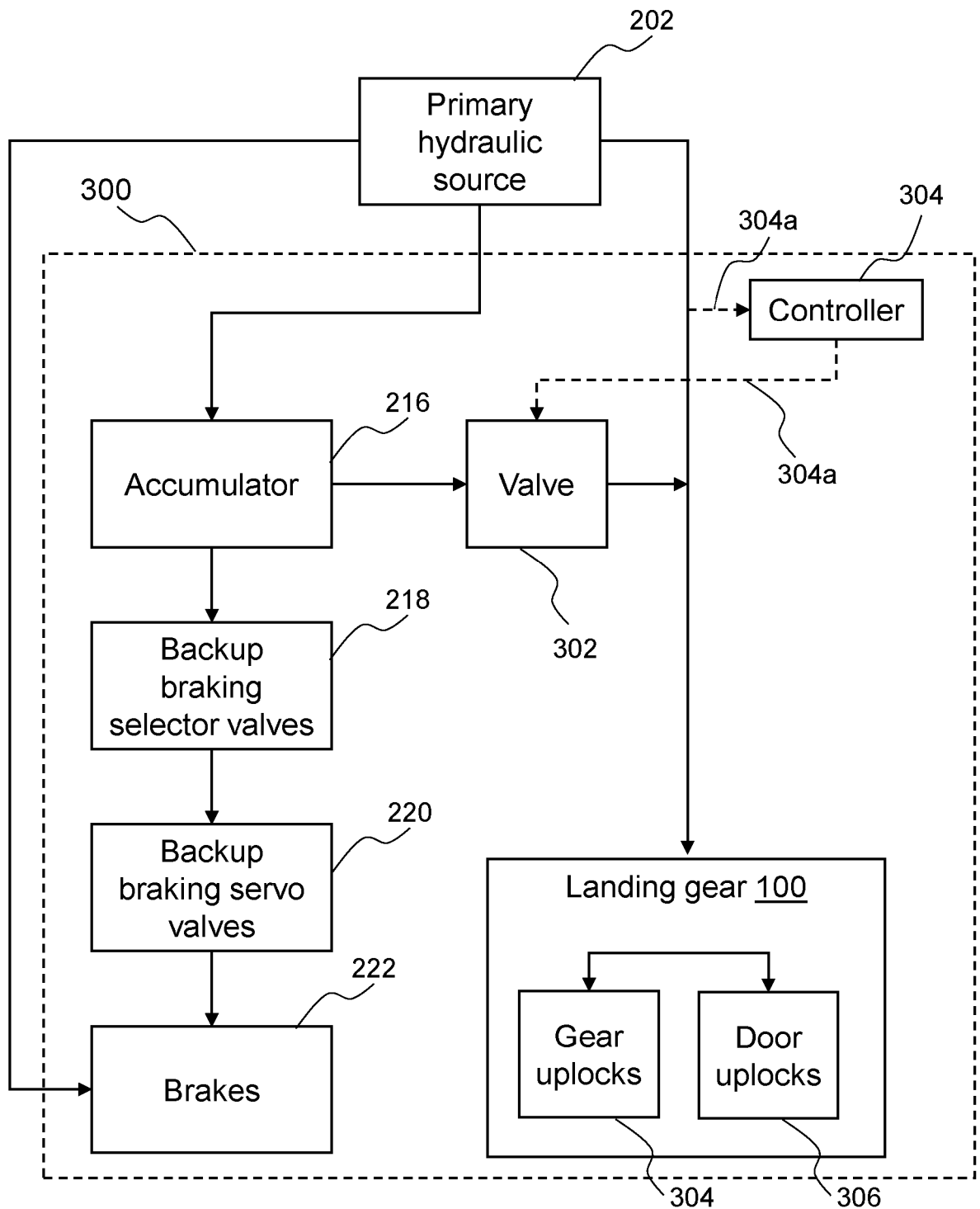
FIG. 3 is a schematic diagram of a hydraulic system for an aircraft according to an embodiment of the invention.

FIG. 3 is a simplified schematic diagram of a hydraulic system 300 for providing hydraulic power to a landing gear arrangement, such as the landing gear arrangement 100 described above with reference to FIG. 1, according to an embodiment of the invention.

Similar to the hydraulic system 200 described above with reference to FIG. 2, the hydraulic system 300 shown in FIG. 3 comprises a primary hydraulic power source 202, an accumulator 216, backup braking selector valve 218 and backup braking servo valve 220, which each operate, as described above with reference to FIG. 2, to apply a brake 222 (such as a wheel brake 116 or brakes).

In the embodiment shown in FIG. 3, the hydraulic system 300 comprises a valve 302. An input of the valve 302 is fluidically connected to the accumulator 216. An output of the valve 302 is fluidically connected to the landing gear arrangement 100. In particular, in the example shown in FIG. 3, the output of the valve 302 is fluidically connected to gear up-locks 304 and door up-locks 306, such as those described above with reference to FIG. 1.

The hydraulic system 300 comprises a controller 304 arranged to detect a failure condition of the primary hydraulic power source 202. For example, the controller 304 may comprise a pressure sensor for sensing a pressure provided by the primary hydraulic power source 202 and a processor to receive a pressure signal (indicated by the dashed arrow 304a) and evaluate the pressure signal.

In the event that there is a failure of the primary hydraulic power source 202, the processor may be programmed to determine that a sensed pressure of the primary hydraulic power source 202 falls below a threshold pressure, for example. However, in contrast to the hydraulic system 200 shown in FIG. 2, the controller 304 is arranged to send a control signal (indicated by the dashed arrow 304b) to operate the valve 302 to provide a transmission path for hydraulic fluid between the accumulator 216 and the landing gear. For example, the valve 302 may be opened to provide hydraulic pressure from the accumulator 216 to the gear up-locks 304 and the door up-locks 306.

In the event of a failure of the primary hydraulic power source 202, hydraulic fluid may no longer be supplied to the accumulator 216, or the primary hydraulic power source 202 may not be able to maintain a specified pressure of hydraulic fluid in the accumulator 216 (since hydraulic fluid in the accumulator may leak, for example). Therefore, the accumulator 216 is selected to provide a sufficient volume of hydraulic fluid, pressurised to a sufficient pressure, to provide hydraulic power to both the brake 222 and the landing gear arrangement 100 (i.e. the gear up-locks 304 and the door up-locks) in the event of a failure of the primary hydraulic power source 202. This enables the hydraulic system 300 to provide backup hydraulic power to both the brake 222 and the landing gear arrangement 100 from a single source of hydraulic power (i.e. the accumulator 216), which reduces the number of components required to provide backup hydraulic power, and thus saves cost and weight.

Figure 4:
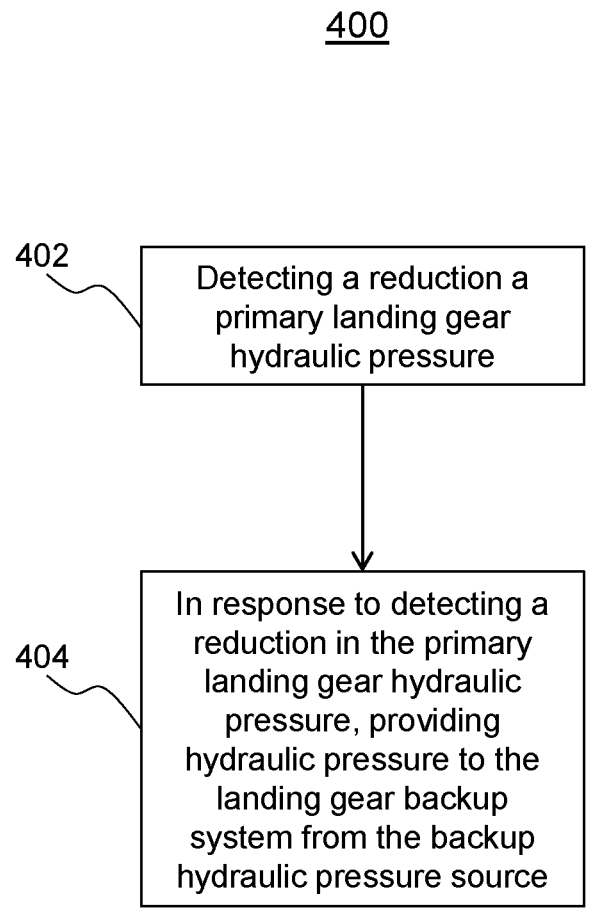
FIG. 4 is a flow diagram illustrating an example of a method of operating an aircraft hydraulic system according to an embodiment of the invention.

FIG. 4 is a flow diagram illustrating a method 400 of operating an aircraft hydraulic system, such as the hydraulic system 300 described above with reference to FIG. 3; that is, a hydraulic system comprising a backup hydraulic pressure source to provide hydraulic pressure to a brake in the event of a reduction of a primary hydraulic brake pressure and a landing gear backup system to provide hydraulic pressure to enable extension and/or retraction of landing gear.

At block 402, a failure condition of a primary landing gear hydraulic pressure source is detected. For example, a reduction or spike in the pressure supplied by the primary hydraulic power source 202 may be detected by a pressure sensor and the detected pressure may be evaluated by the controller 304, as described above with reference to FIG. 3.

At block 404, in response to detecting a failure condition of the primary landing gear hydraulic pressure, the hydraulic system provides hydraulic pressure to the landing gear backup system from a backup hydraulic pressure source. The failure condition could be, for example, a reduction in hydraulic pressure or an increase (e.g. a spike) in hydraulic pressure). For example, as described above with reference to FIG. 3, the controller 304 of the hydraulic system 300 may send a control signal to operate the valve 302 to provide a transmission path for hydraulic fluid between the accumulator 216 and the landing gear arrangement 100. For example, the valve 302 may be opened to provide hydraulic pressure from the accumulator 216 to the gear up-locks 304 and the door up-locks 306.

Although in the hydraulic systems 200, 300 described above with reference to FIGS. 2 and 3, a single primary hydraulic power source is described, it will be understood that some embodiments of the invention, may include multiple primary (i.e. main) sources of hydraulic pressure for which the respective backup pressures source of hydraulic pressure provides backup hydraulic power. In particular, the LGERS and the braking system may each have a dedicated primary source of hydraulic power, with the hydraulic system disclosed with reference to FIG. 3 providing a backup source of hydraulic power in the event of a failure of the primary source of hydraulic power of the LGERS, a failure of the primary source of hydraulic power of the braking system, or a failure of both the primary source of hydraulic power of the LGERS and the primary source of hydraulic power of the braking system.

Figure 5:
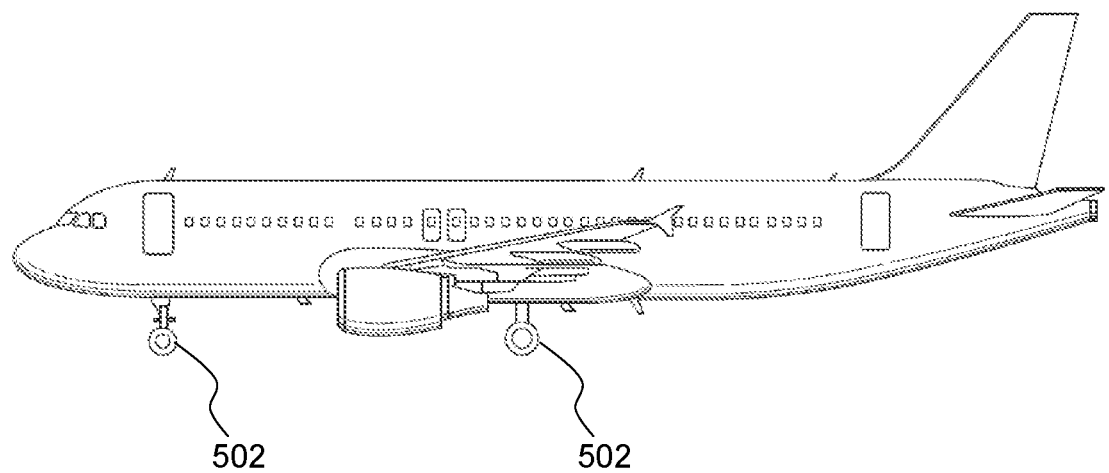
FIG. 5 is a schematic diagram showing a side view of an example of an aircraft of an embodiment of the invention.

In some embodiments, hydraulic system 300 described above with reference to FIG. 3 may be installed in a vehicle. Referring to FIG. 5, there is shown a schematic side view of an example of a vehicle according to an embodiment of the invention. In the example of FIG. 5, the vehicle is an aircraft 500. The aircraft 500 may comprise one or more hydraulic systems, such as the hydraulic system 300 described above with reference to FIG. 3. In other embodiments, the vehicle may be other than an aircraft, such as a road vehicle, a rail vehicle, a watercraft or a spacecraft.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

It is to be noted that the term "or" as used herein is to be interpreted to mean "and/or", unless expressly stated otherwise.

The invention claimed is:

1. A hydraulic system for an aircraft, the hydraulic system comprising:
   a backup hydraulic pressure source configured to provide hydraulic pressure to a brake in the event of a failure condition of a primary hydraulic brake pressure source;
   a landing gear backup system configured to provide hydraulic pressure to enable extension and/or retraction of landing gear in event of a failure condition of a primary landing gear hydraulic pressure source; and
   a controller arranged to automatically detect a failure condition of the primary landing gear hydraulic pressure source,
   wherein, in response to the detected failure condition, the controller is arranged to automatically transmit an activation signal to a valve arranged to fluidically couple the backup hydraulic pressure source to the landing gear backup system, to provide hydraulic pressure to the landing gear backup system from the backup hydraulic pressure source.

2. The hydraulic system according to claim 1, wherein the valve is arranged to selectively direct hydraulic fluid from the backup hydraulic pressure source to the landing gear backup system.

3. The hydraulic system according to claim 1, wherein the backup hydraulic pressure source is an accumulator arranged to receive a supply of pressurised hydraulic fluid from a primary hydraulic pressure source.

4. The hydraulic system according to claim 3, wherein the primary hydraulic pressure source is a hydraulic system powered by the aircraft.

5. The hydraulic system according to claim 1, wherein the landing gear comprises a landing gear lock arranged to hold the landing gear in a retracted state, and wherein the backup hydraulic pressure is to provide hydraulic pressure to deactivate the landing gear lock in the event of the failure condition of the primary landing gear hydraulic pressure source.

6. The hydraulic system according to claim 1, wherein the landing gear comprises a landing gear door lock arranged to hold a landing gear door in a closed state, and wherein the backup hydraulic pressure is to provide hydraulic pressure to deactivate the landing gear door lock in the event of the failure condition of the primary landing gear hydraulic pressure source.

7. The hydraulic system according to claim 1, wherein the failure condition includes a reduction of hydraulic pressure from the primary hydraulic pressure source beyond a specified threshold.

8. A method of operating an aircraft hydraulic system comprising a backup hydraulic pressure source configured to provide hydraulic pressure to a brake in the event of a failure condition of a primary hydraulic brake pressure source and a landing gear backup system configured to provide hydraulic pressure to extend and/or retract a landing gear, the method comprising:
   automatically detecting a failure condition of a primary landing gear hydraulic pressure source; and
   in response to the detection of the detecting a failure condition of the primary landing gear hydraulic pressure source, automatically transmitting an activation signal to a valve arranged to fluidically couple the backup hydraulic pressure source to the landing gear backup system to provide hydraulic pressure to the landing gear backup system from the backup hydraulic pressure source.

9. The method according to claim 8, comprising in response to detecting a failure condition of the primary landing gear hydraulic pressure source, controlling the valve to direct hydraulic fluid from the backup hydraulic pressure source to the landing gear backup system.

10. A non-transitory computer readable storage medium having instructions stored thereon which, when executed by a processor in a hydraulic system comprising a backup hydraulic pressure source to provide hydraulic pressure to a brake in the event of a failure condition of a primary hydraulic brake pressure source and a landing gear backup system to provide hydraulic pressure to enable extension and/or retraction of landing gear, causes the processor to:
   automatically detect a failure condition of a primary landing gear hydraulic pressure source; and
   in response to detecting a failure condition of the primary landing gear hydraulic pressure source, automatically transmit an activation signal to a valve arranged to fluidically couple the backup hydraulic pressure source to the landing gear backup system, to provide hydraulic pressure to the landing gear backup system from the backup hydraulic pressure source.

11. A method to operate an aircraft hydraulic system comprising:
   using a valve to isolate a backup hydraulic pressure source for a brake from a backup hydraulic system for a landing gear;
   pressurizing a hydraulic system for the landing gear with hydraulic fluid from a primary hydraulic pressure source;
   automatically detecting a failure condition of the primary hydraulic pressure source;
   in response to the detection of the failure condition, automatically actuating the valve to fluidically couple the backup hydraulic pressure source and the hydraulic system; and
   in response to the actuation of the valve, using fluid pressure from the backup hydraulic pressure source to operate the hydraulic system for the landing gear.

12. The method of claim 11 further wherein the backup hydraulic pressure source is an accumulator and the method further comprises pressurizing the accumulator with hydraulic fluid from the primary hydraulic pressure source before the actuation of the valve.

13. The method of claim 11 wherein the landing gear includes a landing gear lock arranged to hold the landing gear in a retracted state, and wherein the method includes using the fluid pressure from the backup hydraulic pressure source to deactivate the landing gear lock.

* * * * *